United States Patent [19]
Von Herzen et al.

[11] Patent Number: 5,924,115
[45] Date of Patent: Jul. 13, 1999

[54] HIERARCHICAL MEMORY ARCHITECTURE FOR A PROGRAMMABLE INTEGRATED CIRCUIT HAVING AN INTERCONNECT STRUCTURE CONNECTED IN A TREE CONFIGURATION

[75] Inventors: Brian Von Herzen, Carson City, Nev.; Richard G. Shoup, San Jose, Calif.

[73] Assignee: Interval Research Corporation, Palo Alto, Calif.

[21] Appl. No.: 08/625,171

[22] Filed: Mar. 29, 1996

[51] Int. Cl.[6] .............................. G06F 12/00; G06F 13/00
[52] U.S. Cl. ........................ 711/117; 711/122; 711/154; 711/159
[58] Field of Search ................................. 395/444, 481, 395/486; 711/117, 154, 159, 122

[56] References Cited

U.S. PATENT DOCUMENTS

| | | | |
|---|---|---|---|
| 3,740,723 | 6/1973 | Beausoleil et al. | 395/444 |
| 4,870,382 | 9/1989 | Keate et al. | 331/4 |
| 5,047,989 | 9/1991 | Canepa et al. | 395/444 |
| 5,097,414 | 3/1992 | Tone | 395/444 |
| 5,103,426 | 4/1992 | Hidaka et al. | 365/230.03 |
| 5,313,119 | 5/1994 | Cooke et al. | 326/41 |
| 5,414,377 | 5/1995 | Freidin . | |
| 5,432,719 | 7/1995 | Freeman et al. . | |
| 5,455,525 | 10/1995 | Ho et al. . | |
| 5,471,623 | 11/1995 | Napolitano, Jr. | 395/200.03 |
| 5,481,206 | 1/1996 | New et al. . | |
| 5,488,316 | 1/1996 | Freeman et al. . | |
| 5,574,930 | 11/1996 | Halverson, Jr. et al. | 395/800 |

OTHER PUBLICATIONS

"Tools to speed FPGA development", IEEE Spectrum, pp. 88–95, Nov. 1994.

*Primary Examiner*—Tod R. Swann
*Assistant Examiner*—Tuan V. Thai
*Attorney, Agent, or Firm*—Brooks & Kushman P.C.

[57] ABSTRACT

A hierarchical memory for use in a programmable gate array integrated circuit comprises an interconnect structure having a plurality of interconnect nodes electrically connected in a tree configuration. The interconnect nodes include a root node which receives a multi-bit address word indicative of a selected memory location. The hierarchical memory further includes a plurality of memory cells electrically connected to the interconnect structure to form leaf nodes of the tree. Each of the memory cells contains at least one memory location for storing binary data. The interconnect structure is traversed from the root node to a memory cell containing the selected memory location based upon the multi-bit address word, wherein the interconnect structure provides a communication path for accessing the selected memory location from the root node.

25 Claims, 6 Drawing Sheets

HIERARCHICAL MEMORY ARCHITECTURE FOR A PROGRAMMABLE INTEGRATED CIRCUIT HAVING AN INTERCONNECT STRUCTURE CONNECTED IN A TREE CONFIGURATION

TECHNICAL FIELD

The present invention relates to programmable integrated circuit architectures, and more particularly, to field programmable gate array architectures.

BACKGROUND ART

Programmable integrated circuits, such as programmable gate arrays, are general-purpose combinatorial or sequential digital components which leave the manufacturer in an unprogrammed state. The ultimate function of the programmable integrated circuit is determined by a designer who typically enters a representation of the desired function into a programming unit. The representation may be in a graphical schematic form, a text-based form, or a combination thereof. The programming unit, in turn, delivers an appropriate sequence of signals to the programmable integrated circuit for configuring programmable switches contained therein. The programmable switches can comprise fuses, antifuses, floating-gate MOSFETs, and RAM cells. Floating gate devices can be erased and reprogrammed, while the RAM-base devices can be reconfigured dynamically.

One type of programmable integrated circuit is known as a field programmable gate array (FPGA). An FPGA is a semicustom device based on an array of generic cells, each having a programmable function, surrounded by a programmable interconnect network. The interconnect network is programmed via programmable crosspoint switches contained therein. The combined programming of the cell functions and the interconnect network define the function of the FPGA. FPGAs are advantageous in providing a short design turnaround time in comparison to other types of gate arrays.

A general problem in computing, using either programmable logic devices or microprocessors, is one of unifying program and data in hardware for the purpose of computation. Since the beginning of computers, however, a central processing unit (CPU) and a memory have been constructed out of separate types of hardware circuits and structures. Using a similar non-unified paradigm for memory and processors, attempts are being made to incorporate RAM into an FPGA.

In the realm of software, LISP is one of a few languages which attempts to unify the program and data information structures. However, this unification is only done in software, and is not done in the hardware which executes the software.

SUMMARY OF THE INVENTION

It is an object of the present invention to provide an architecture for a programmable integrated circuit in which the means for computation and storage are merged into a single coherent and homogeneous structure.

A further object of the present invention is to provide an architecture for a programmable integrated circuit which accommodates hierarchical restructurable memory.

In carrying out the above objects, the present invention provides a hierarchical memory for use in a programmable integrated circuit. The hierarchical memory comprises an interconnect structure having a plurality of interconnect nodes electrically connected in a tree configuration. The interconnect nodes include a root node which receives an multi-bit address word indicative of a selected memory location. The hierarchical memory further includes a plurality of memory cells electrically connected to the interconnect structure to form leaf nodes of the tree. Each of the memory cells contains at least one memory location for storing binary data. The interconnect structure is traversed from the root node to a memory cell containing the selected memory location based upon the multi-bit address word, wherein the interconnect structure provides a communication path for accessing the selected memory location from the root node.

Further in carrying out the above objects, the present invention provides a method of providing a hierarchical memory in a programmable integrated circuit. The method includes a step of providing an interconnect structure in the programmable integrated circuit, the interconnect structure having a plurality of interconnect nodes including a root node electrically connected in a tree configuration. A step of providing a plurality of memory cells in the programmable integrated circuit is performed. The memory cells are electrically connected to the interconnect structure to form leaf nodes of the tree, and each of the memory cells contains at least one memory location for storing binary data. The method further includes steps of receiving a multi-bit address word indicative of a selected memory location at the root node, and traversing the interconnect structure from the root node to a memory cell containing the selected memory location based upon the multi-bit address word. Next, steps of providing a communication path using the interconnect structure, and accessing the selected memory location from the root node via the communication path are performed.

In preferred embodiments of the present invention disclosed herein, each of the interconnect nodes, in response to receiving a plurality of address bits, branches to a successor node in dependence upon one of the address bits and provides a remaining at least one of the address bits to the successor node to traverse the interconnect structure.

Once the communication path is provided, a signal representative of a bit stored in the selected memory location can be communicated from the one of the memory cells to the root node via the communication path. Alternatively, a signal representative of a bit to be stored in the selected memory location can be communicated from the root node to the one of the memory cells via the communication path. Here, a control signal for enabling the bit to be stored in the selected memory location is communicated from the root node to the one of the memory cells via the communication path.

Preferably, the memory cells are homogeneous, with each including a corresponding random access memory. The programmable integrated circuit is amenable to implementation in a programmable gate array integrated circuit such as a field programmable gate array.

These and other features, aspects, and embodiments of the present invention will become better understood with regard to the following description, appended claims, and accompanying drawings.

BEST MODE FOR CARRYING OUT THE INVENTION

Figure 1:
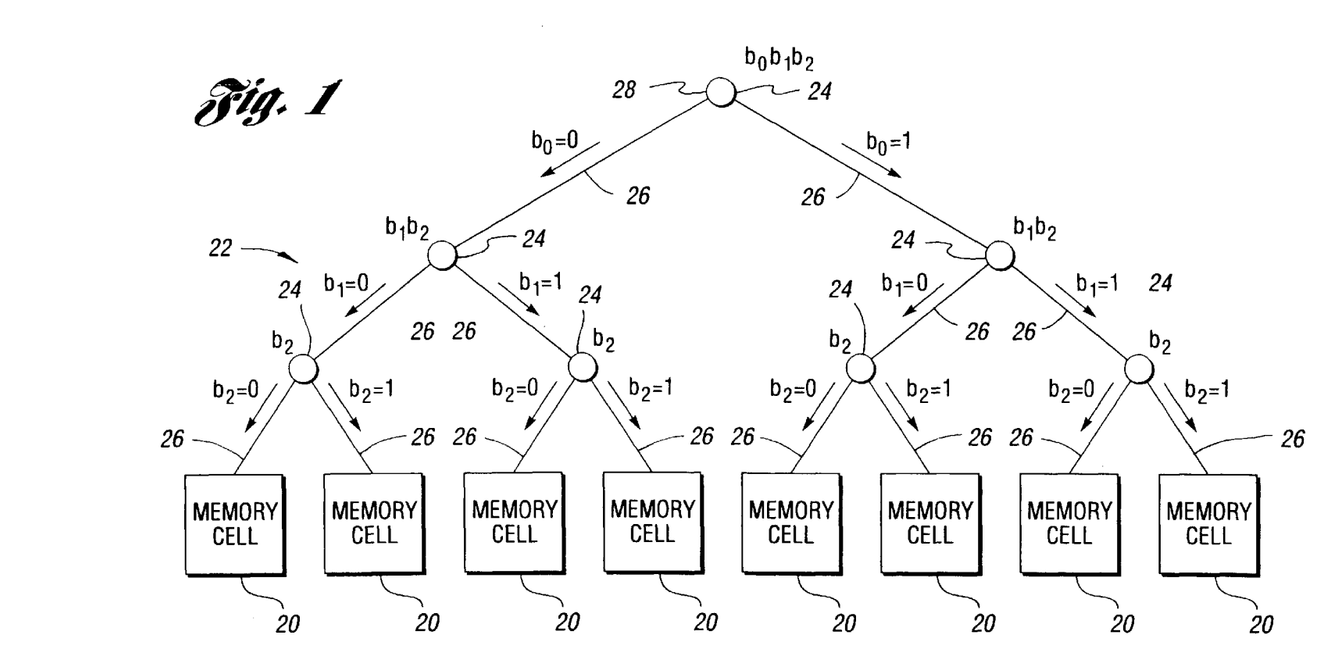
FIG. 1 is a block diagram of a hierarchical memory structure in accordance with embodiments of the present invention.

Referring to FIG. 1, there is shown a block diagram of a hierarchical memory structure for use in a programmable gate array in accordance with the present invention. The memory structure comprises a plurality of homogeneous memory cells 20. Each of the memory cells 20 contains at least one memory location for storing and retrieving binary data. Preferably, the memory cells 20 each contain the same number of memory locations therein.

The memory structure further comprises an interconnect structure 22 coupled to the memory cells 20. The interconnect structure 22 contains a plurality of branching nodes 24 interconnected by branches 26 to form a tree-like structure. The branching nodes 24 include a root node 28 which receives a multibit memory address word indicative of a memory location which is to be accessed, i.e., a memory location which is to be either read from or written to.

Each of the branching nodes 24 acts to receive a multibit address word from a predecessor branching node, strip off a bit from the address word, and branch to a successor node based upon the bit which was stripped. As a result, a memory address starting at the root node 28 has a bit stripped therefrom at each intermediate node of the tree. Further, the tree is traversed down toward a leaf containing the desired one of the memory cells 20 based upon the stripped bits. In a preferred embodiment, each of the interconnect nodes 24 performs the steps of stripping and branching based upon a most-significant bit of the multibit address word received thereby.

Every operation reads data stored at the desired address, and passes the data up the hierarchy along a data line. If a write line is enabled, the data on the data line is stored in at the desired address.

The above-described interconnect structure 22 allows for a single large memory or a plurality of smaller memories to be accessed simultaneously for local computation.

Figure 2:
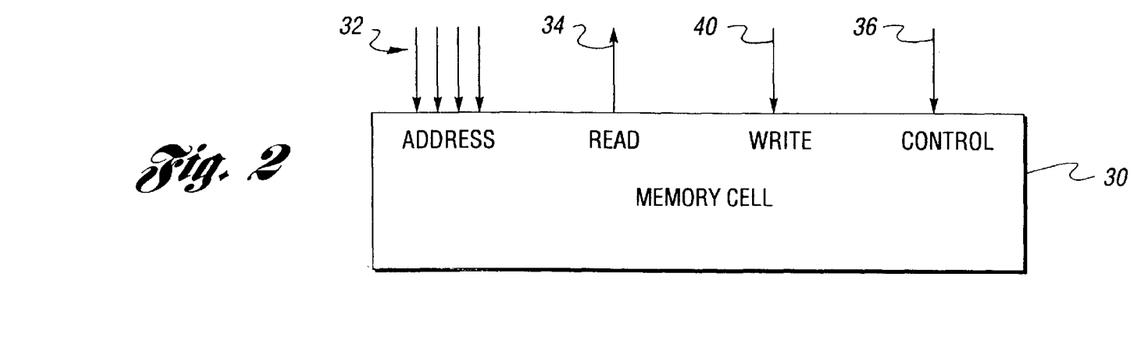
FIG. 2 is a block diagram of a memory cell located at the leaf or bottom level of the hierarchy.

FIG. 2 is a block diagram of a memory cell 30 located at the leaf or bottom level of the hierarchy. The memory cell 30 has a plurality of bits of information contained at a plurality of memory locations. The memory locations are addressed via a plurality of address inputs 32. In a preferred embodiment, the memory cell 30 contains 16 bits of information which are addressed using four address inputs, i.e., the memory cell 30 is a 16×1 RAM (random access memory).

A read data output 34 provides a signal representation of the bit stored at the memory location addressed using the address inputs 32. A write control input 36 and a write data input 40 are used for storing a bit at a memory location addressed using the address inputs 32. In particular, the bit represented by a signal provided to the write data input 40 is stored at the desired memory location if an enable signal is applied to the write control input 36.

Figure 3:
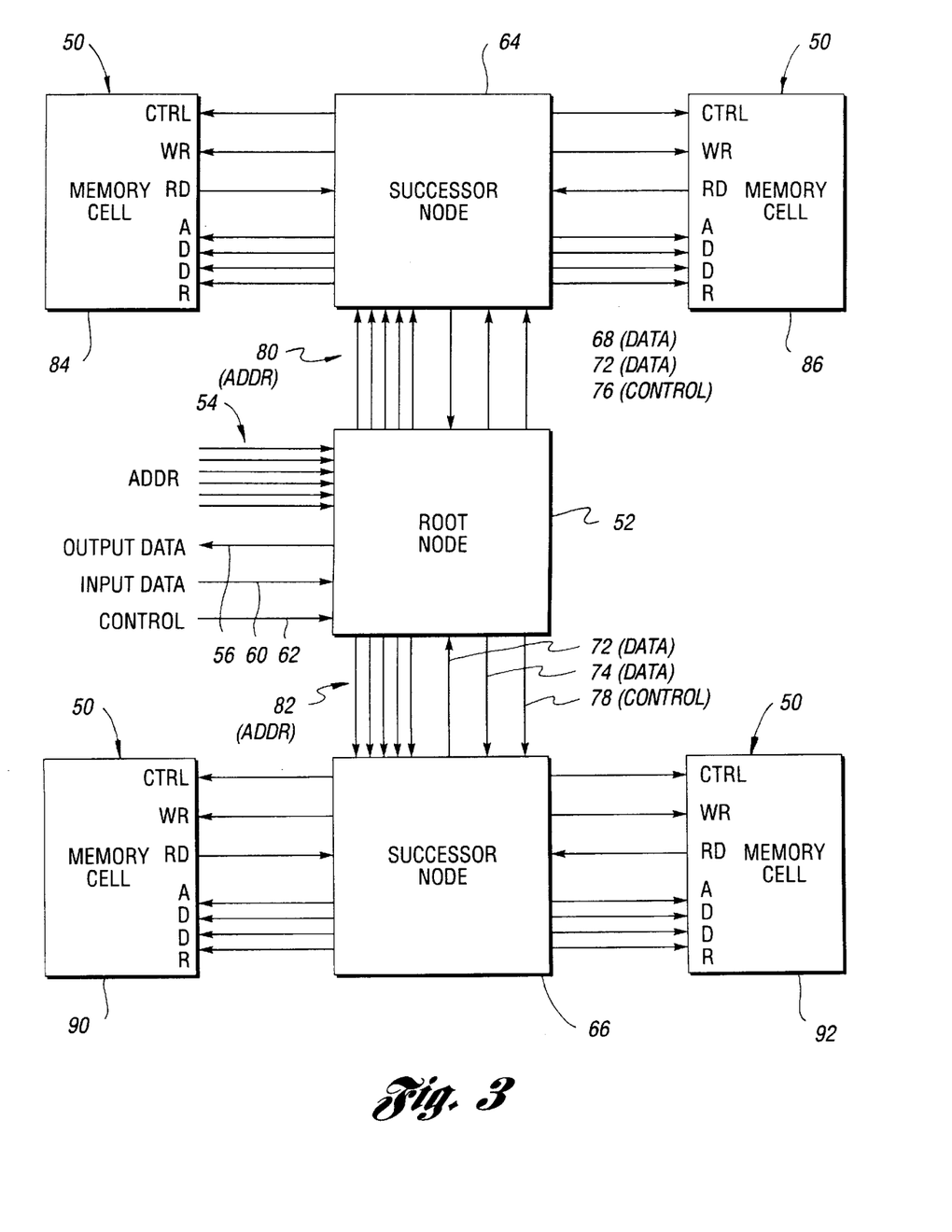
FIG. 3 is a block diagram illustrating a hierarchical organization of a plurality of homogeneous, single-bit memory cells to form a multibit memory.

Turning now to FIG. 3, there is shown a block diagram illustrating a hierarchical organization of a plurality of homogeneous, single-bit memory cells 50 to form a memory. For illustrative purposes, the hierarchical organization is used to form a 64×1 RAM using 16×1 RAMs as the single-bit memory cells 50.

A root node 52 receives a plurality of address bits, representative of a desired address to be accessed, along address lines 54. In the illustrated embodiment, six address lines 54 are utilized to identify each of 64 addresses. The root node 52 further includes an output data line 56 for providing a data bit which is read from the memory, and an input data line 60 for receiving a data bit which is to be written to the memory. A control line 62 is used for receiving a signal which enables writing of data into the memory.

Based upon the most significant of the address bits, the root node 52 branches to one of two successor nodes 64 and 66. In particular, the output data line 56 is selectively connected to one of data lines 68 and 70, the input data line 60 is selectively connected to one of data lines 72 and 74 based upon the most significant bit, and the control line 62 is selectively connected to one of control lines 76 and 78. The remaining five address bits (after stripping off the most significant bit) received along address lines 54 are provided to the successor nodes 64 and 66 by address lines 80 and 82, respectively.

Each of the successor nodes 64 and 66 is capable of branching based upon the most significant of the remaining five address bits. The successor node 64 branches to one of two memory cells 84 and 86 based upon the most significant bit. Similarly, the successor node 66 branches to one of two memory cells 90 and 92 based upon the most significant bit. The remaining four address bits (after stripping off the most significant of the five address bits) are provided to the address inputs of the memory cells 84, 86, 90, and 92. The four remaining address bits identifies one of 16 addresses within the memory cell identified by the two stripped bits.

If data stored at the desired address is retrieved, the data is passed up the hierarchy of nodes along a series of the data lines connecting the nodes. If data is to be stored at the desired address, the data is passed down the hierarchy of nodes along a series of the data lines to the desired address.

Figure 4:
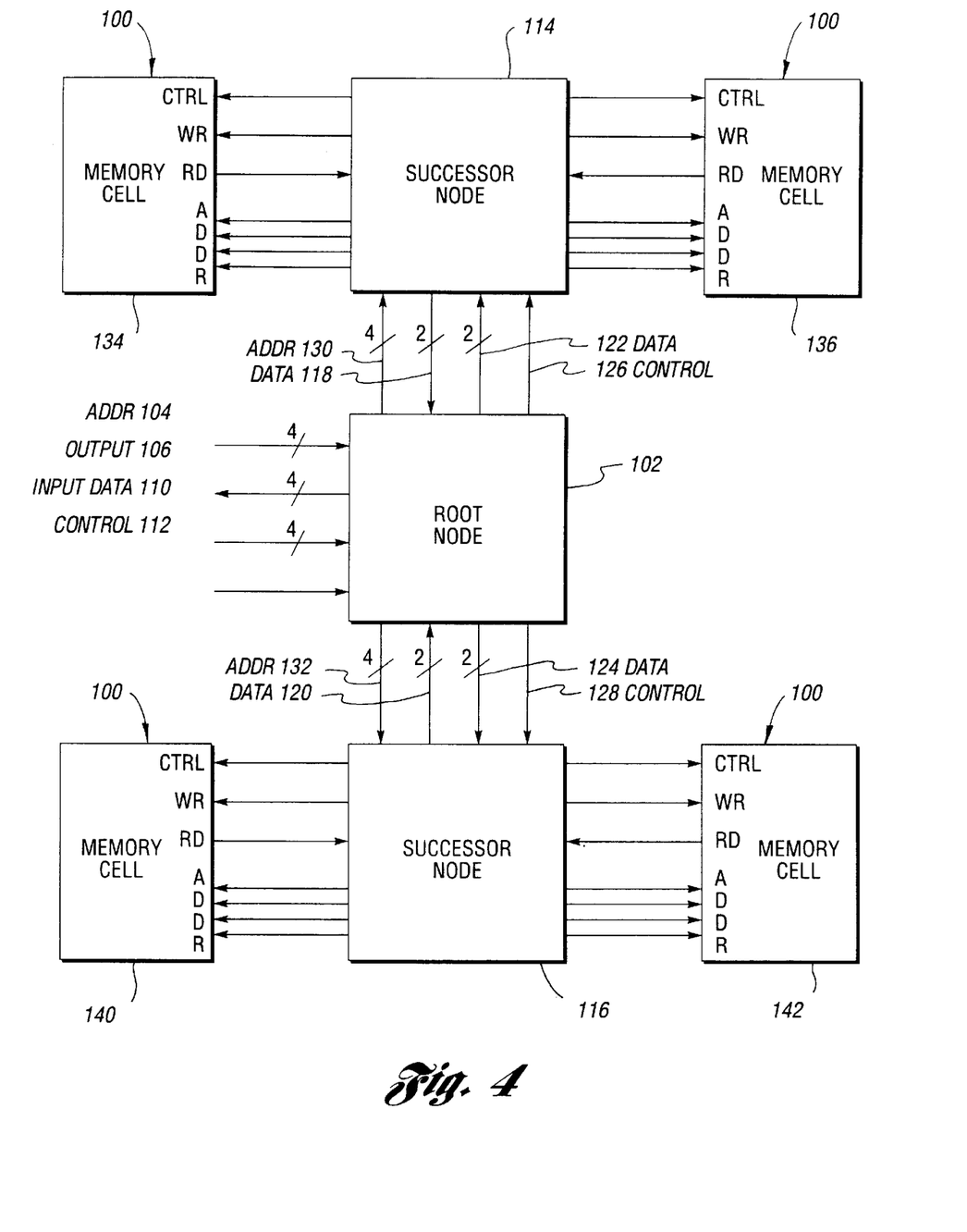
FIG. 4 shows a block diagram illustrating an alternative hierarchical organization of a plurality of homogeneous, single-bit memory cells to form a multibit memory.

Referring to FIG. 4, there is shown a block diagram illustrating an alternative hierarchical organization of a plurality of homogeneous, single-bit memory cells 100 to form a multibit memory. This alternative hierarchical organization differs from the organization of FIG. 3 in that branching nodes do not perform a step of stripping off a bit from the address word. For illustrative purposes, the hierarchical organization is used to form a 16×4 RAM using 16×1 RAMs as the single-bit memory cells 100.

A root node 102 receives a plurality of address bits, representative of a desired address to be accessed, along address lines 104. In the illustrated embodiment, four address lines 104 are utilized to identify each of 16 addresses. The root node 102 further includes output data lines 106 for providing a plurality of data bits which are read from the multibit memory, and input data lines 110 for receiving a plurality of data bits which are to be written to the multibit memory. In the illustrated embodiment, there are four of data lines 106 and 110. A control line 112 is used for receiving a signal which enables writing of data into the multibit memory.

The root node 102 is connected to two successor nodes 114 and 116. Two of the four output data lines 106 are connected to a pair of data lines 118, while the other two of the four output data lines 106 are connected to a pair of data lines 120. Similarly, two of the four input data lines 110 are connected to a pair of data lines 122, and the other two of the four input data lines 110 are connected to a pair of data lines 124. The control line 112 is connected to control lines 126 and 128. The address bits received along address lines 104 are provided to the successor nodes 114 and 116 by address lines 130 and 132, respectively.

The successor node 114 is connected to two memory cells 134 and 136. One of the pair of data lines 118 is connected to the read data output of the memory cell 134, while the other of the pair of data lines 118 is connected to the read data output of the memory cell 136. Similarly, one of the pair of data lines 122 is connected to the write data input of the memory cell 134, while the other of the pair of data lines 122 is connected to the write data input of the memory cell 136. The control line 126 is connected to the control input of the memory cells 134 and 136.

In a similar manner, the successor node 116 is connected to two memory cells 140 and 142. One of the pair of data lines 120 is connected to the read data output of the memory cell 140, while the other of the pair of data lines 120 is connected to the read data output of the memory cell 142. Similarly, one of the pair of data lines 124 is connected to the write data input of the memory cell 140, while the other of the pair of data lines 124 is connected to the write data input of the memory cell 142. The control line 128 is connected to the control input of the memory cells 140 and 142.

In this architecture, four bits of retrieved data are simultaneously passed up the hierarchy of nodes along corresponding series of the data lines. Similarly, four bits of data to be stored at a desired address are simultaneously passed down the hierarchy of nodes along corresponding series of the data lines.

In a preferred embodiment, synchronous RAMs are employed as the memory cells. In a synchronous RAM, a number of cycles elapse between sending address and write data, and receiving read data. Consequently, a pipeline may be employed using synchronous RAMs, wherein one stage of the pipeline corresponds to one stage of the hierarchy. In this way, delays of each stage of the pipeline are matched, resulting in high throughput and efficiency. For intermediate nodes, independent write and read data paths are preferred.

Two approaches for providing a memory using homogeneous memory cells have been described. Next, approaches for performing steps of computation using the same type of memory cells are described.

Figure 5:
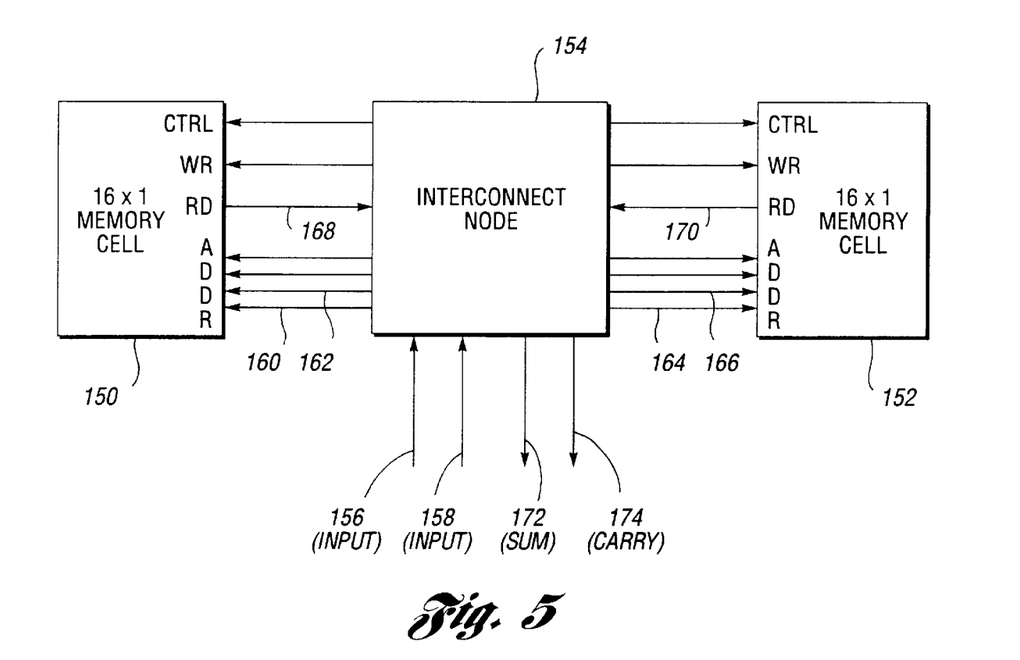
FIG. 5 is a block diagram of a half adder formed using two homogeneous memory cells.

FIG. 5 is a block diagram of a half adder formed using two homogeneous memory cells 150 and 152. For the purpose of homogeneity with the memory cells used in the aforementioned memory architectures, the memory cells 150 and 152 are illustrated as 16×1 RAMs. It is noted, however, that other embodiments of the half adder are not limited to use of 16×1 RAMs.

The half adder includes an interconnect node 154 which receives a first operand bit along a first input line 156 and a second operand bit along a second input line 158. The interconnect node 154 connects the first and second input lines 156 and 158 to address lines 160 and 162, respectively, of the memory cell 150. Similarly, the interconnect node 154 connects the first and the second input lines 156 and 158 to address lines 164 and 166, respectively, of the memory cell 152.

The memory cell 150 is prestored to produce, at its read output 168, the one-bit sum of the first operand bit and the second operand bit. Similarly, the memory cell 152 is prestored to produce, at its read output 170, the carry bit of the sum of the first operand bit and the second operand bit. The interconnect node 154 connects a sum output line 172 to the read output 168, and a carry output line 174 to the read output 170.

Figure 6:
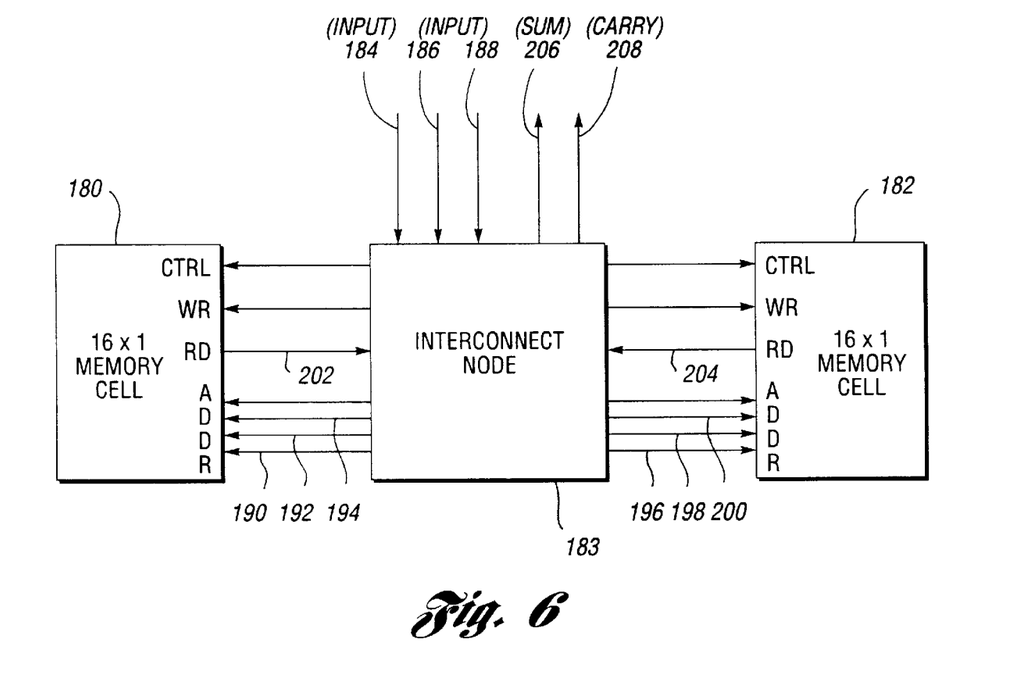
FIG. 6 is a block diagram of a full adder formed using two homogeneous memory cells.

FIG. 6 is a block diagram of a full adder formed using two homogeneous memory cells 180 and 182. For the purpose of homogeneity, the memory cells 180 and 182 are illustrated as 16×1 RAMs.

The full adder includes an interconnect node 183 which receives a first operand bit along a first input line 184, a second operand bit along a second input line 186, and a carry-in bit along a third input line 188. The interconnect node 184 connects the input lines 184, 186, and 188 to address lines 190, 192, and 194, respectively, of the memory cell 180. Similarly, the interconnect node 184 connects the inputs lines 184, 186, and 188 to address lines 196, 198, and 200, respectively, of the memory cell 182.

The memory cell 180 is prestored to produce, at its read output 202, the one-bit sum of the first operand bit, the second operand bit, and the carry-in bit. The memory cell 182 is prestored to produce, at its read output 204, the carry-out bit of the sum. The interconnect node 184 connects a sum output line 206 to the read output 202, and a carry output line 208 to the read output 204.

Figure 7:
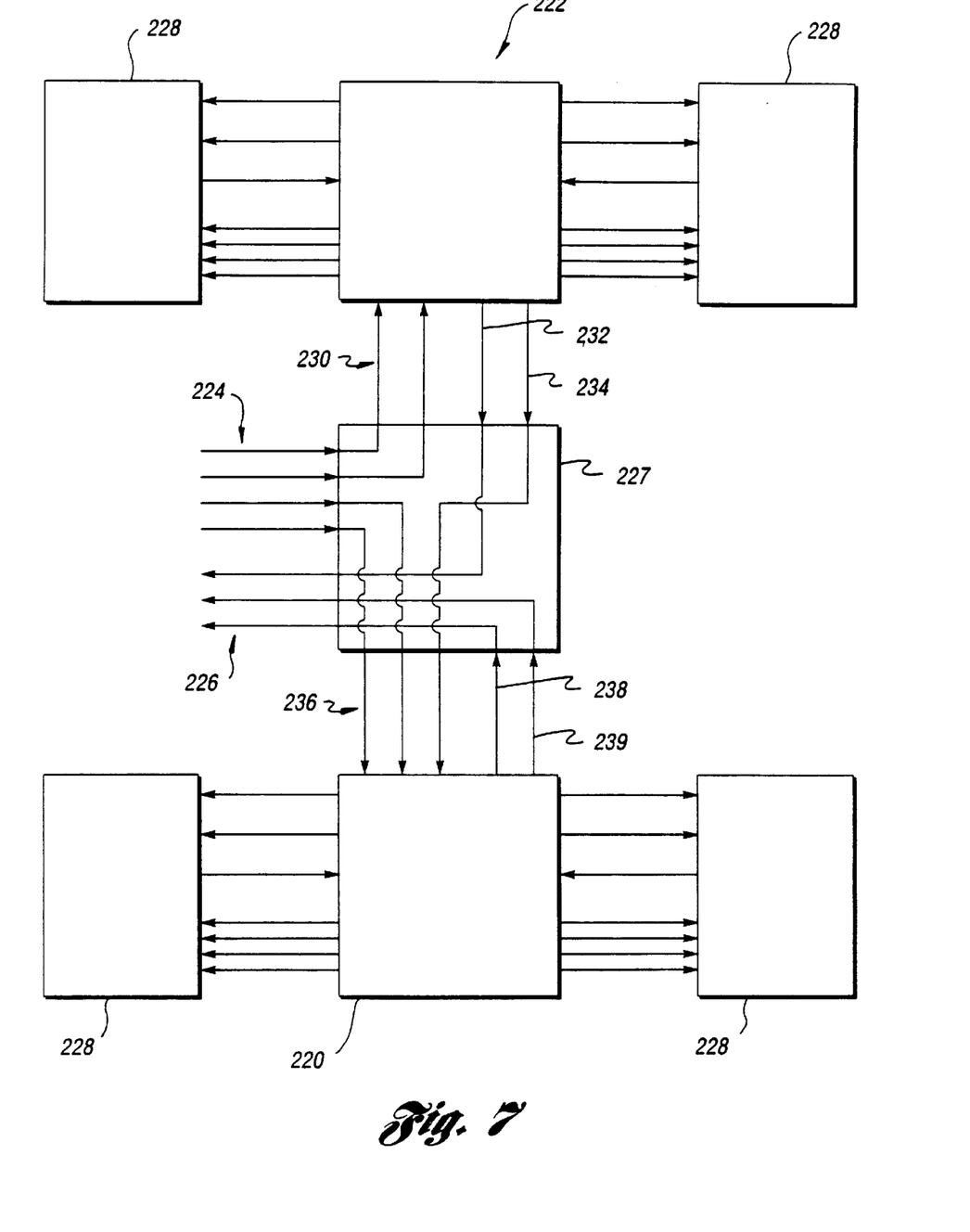
FIG. 7 is a block diagram of a combination full adder/half adder utilizing a full adder and a half adder in accordance with the present invention.

FIG. 7 is a block diagram of a combination full adder/half adder which utilizes a full adder 220 and a half adder 222 in accordance with the present invention. The combination full adder/half adder has four inputs 224 and three outputs 226 which are applied to an interconnect node 227. The interconnect node 227 connects the four inputs and three outputs 226 to four leaf cells 228.

In particular, the interconnect node 227 connects two of the four inputs 224 to two input lines 230 of the half adder 222. The half adder 222 adds two operand bits received along the two input lines 230 to form a sum bit along a sum output line 232 and a carry bit along a carry output line 234.

The interconnect node 227 also connects the carry output line 234, along with the other two of the four inputs 224 to three input lines 236 of the full adder 220. The full adder 220 adds the three bits received along the three input lines 236 to form a sum bit along a sum output line 238 and a carry bit along a carry output line 239. The sum output line 232, the sum output line 238, and the carry output line 239 are connected to the three output lines 226 by the interconnect node 227.

It is noted that if each of the leaf cells 228 contains a 16×1 RAM, the combination full adder/half adder can be implemented in the same chip area as the implementation of the memories in FIGS. 3 and 4.

Figure 8:
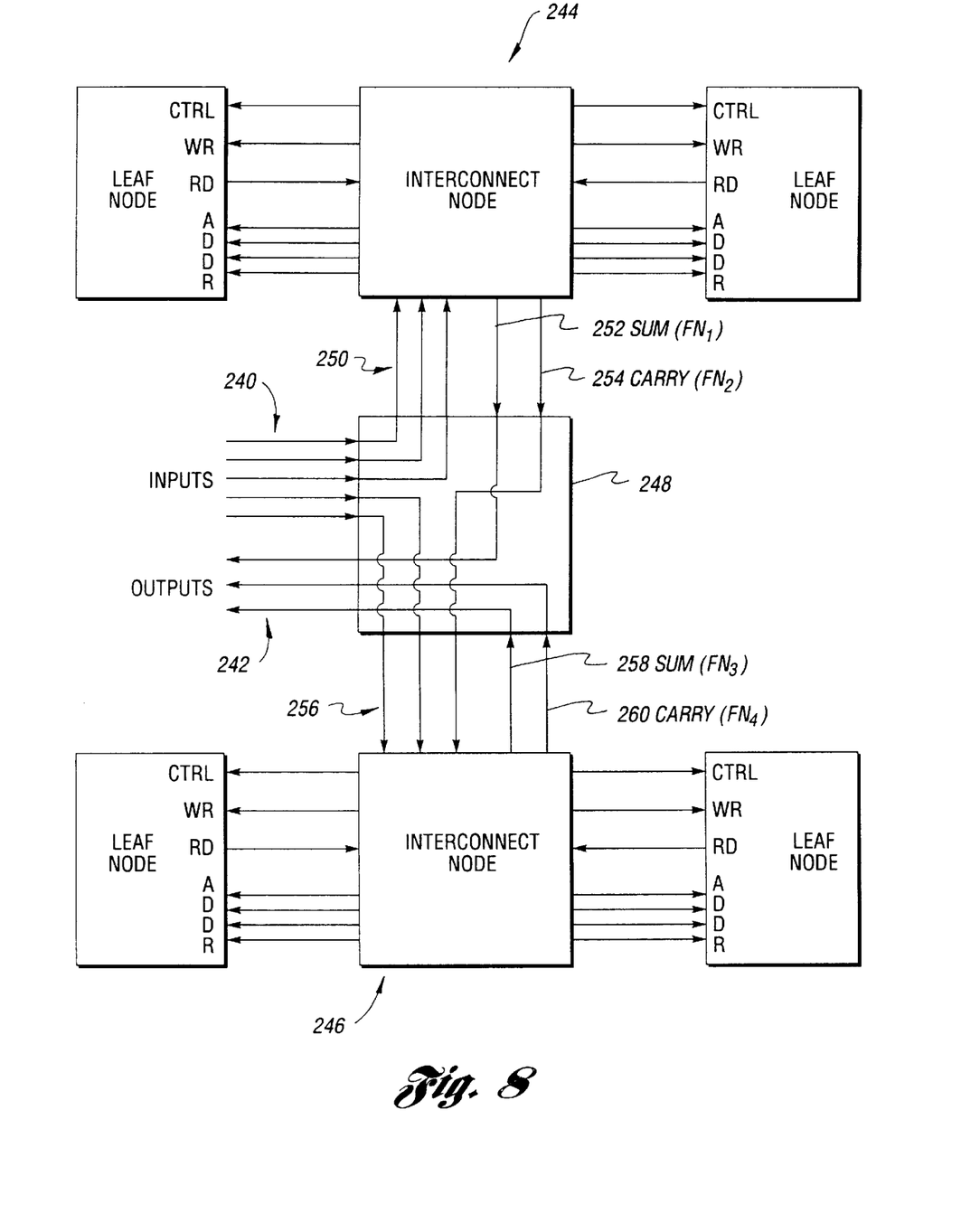
FIG. 8 is a block diagram of a combination full adder/full adder.

FIG. 8 is a block diagram of a combination full adder/full adder having five input wires 240 and three output wires 242. The combination full adder/full adder includes two full adders 244 and 246 constructed in accordance with embodiments of the present invention.

An interconnect node 248 connects three of the five inputs 240 to three input lines 250 of the full adder 244. The full adder 244 adds three operand bits received along the three input lines 250 to form a sum bit along a sum output line 252 and a carry bit along a carry output line 254.

The interconnect node 248 connects the carry output line 254, along with the other two of the five inputs 240 to three input lines 256 of the full adder 246. The full adder 246 adds the three bits received along the three input lines 256 to form a sum bit along a sum output line 258 and a carry bit along a carry output line 260. The sum output line 252, the sum output line 258, and the carry output line 260 are connected to the three output lines 242 by the interconnect node 248.

It is noted that bit-level pipelining is very attractive with the above-described architecture. However, suitable delays are also required to be placed in other stages of the system.

Although described in terms of parallel adders, alternative embodiments of the present invention can utilize serial adders. These are attractive in reducing the number of wires and computational cells in the integrated circuit. If wires (i.e. the number of wires times distance travelled) are expensive in an architecture, then a serial architecture may be preferred.

One challenge with a serial computational architecture is in interfacing it to a parallel address RAM. This would occur, for example, if two numbers are to be added to form an address which is applied to a lookup table. In this case, a number of serial-to-parallel converters are required to convert the sum into a parallel address if a parallel address RAM is utilized. Hence, in some instances, it may be preferred to utilize a serial address RAM rather than an address-parallel RAM.

The above-described embodiments of the present invention have many advantages. By unifying the concepts of computational hardware and storage hardware, a more flexible and general computing resource is provided. By allowing hierarchical reconfiguration of memory elements, memories of varying size and shape may be created for different applications using the same hardware.

By using only one type of memory cell, a homogeneous architecture for a programmable gate array is produced. The homogeneous architecture has fewer routing problems than heterogeneous architectures, which required special limited resources for routing and sharing. The resulting homogeneous architecture, in contrast, utilizes dedicated, local resources.

Embodiments of the present invention are well-suited for application in high-bandwidth, interactive computational processes such as video processing, pattern recognition, interactive multimedia, and virtual reality.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A hierarchical memory for use in a programmable integrated circuit, the hierarchical memory comprising:

a reconfigurable interconnect structure having a plurality of interconnect nodes electrically connected in a tree configuration, the interconnect nodes including a root node which receives a parallel multi-bit data word indicative of a selected memory location; and a plurality of memory cells electrically connected to the reconfigurable interconnect structure to form leaf nodes of the tree, each of the memory cells containing at least one memory location for storing binary data;

wherein the interconnect nodes include a first interconnect node electrically connected to the root node for receiving the parallel multi-bit data word, a second interconnect node in communication with the first interconnect node and at least two of the plurality of memory cells, the first interconnect node being connected to a first portion of the parallel multi-bit work, and a third interconnect node in communication with the first and second interconnect nodes, the third interconnect node being connected to a second portion of the parallel multi-bit data word; and wherein the interconnect structure is traversed from the root node to a memory cell containing the selected memory location based upon at least a portion of the parallel multi-bit data word, and wherein the interconnect structure provides a communication path for exchanging data between the selected memory location and the root node.

2. The hierarchical memory of claim 1 wherein the memory cells are homogeneous.

3. The hierarchical memory of claim 1 wherein each of the memory cells contains a plurality of memory locations.

4. The hierarchical memory of claim 1 wherein each of the interconnect nodes, in response to receiving a plurality of parallel data bits, branches to a successor node in dependence upon one of the data bits and provides a remaining at least one of the parallel data bits to the successor node.

5. The hierarchical memory of claim 1 wherein a signal representative of a bit stored in the selected memory location is communicated from the one of the memory cells to the root node via the path.

6. The hierarchical memory of claim 1 wherein a signal representative of a bit to be stored in the selected memory location is communicated from the root node to the one of the memory cells via the communication path.

7. The hierarchical memory of claim 6 wherein a control signal for enabling the bit to be stored in the selected memory location is communicated from the root node to the one of the memory cells via the communication path.

8. The hierarchical memory of claim 1 wherein each of the memory cells includes a corresponding random access memory.

9. The hierarchical memory of claim 1 wherein the programmable integrated circuit is a programmable gate array integrated circuit.

10. The hierarchical memory of claim 9 wherein the programmable gate array integrated circuit is a field programmable gate array.

11. A hierarchical memory for use in a field-programmable gate array integrated circuit, the hierarchical memory comprising:

a reconfigurable interconnect structure having a plurality of interconnect nodes electrically connected in a tree configuration, the interconnect nodes including a root node which receives a parallel multi-bit address word indicative of a selected memory location; and a plurality of homogeneous random-access memory cells electrically connected to the interconnect structure to form leaf nodes of the tree, each of the memory cells containing a plurality of memory locations for storing binary data;

wherein each of the interconnect nodes, in response to receiving a plurality of parallel address bits, branches to a successor node in dependence upon one of the parallel address bits and provides a remaining at least one of the address bits in parallel to the successor node, whereby the interconnect structure is traversed from the root node to a memory cell containing the selected memory location based upon the parallel multi-bit address word, and wherein the interconnect structure provides a communication path for accessing the selected memory location from the root node, the interconnect structure including a first interconnect node electrically connected to the root node for receiving the parallel multi-bit data word; a second interconnect node in communication with the first interconnect node, at least two of the memory cells, and a first portion of the parallel multi-bit word; and a third interconnect node in communication with the first and second interconnect nodes and a second portion of the parallel multi-bit data word.

12. A method of providing a hierarchical memory in a programmable integrated circuit, the method comprising the steps of:

providing a reconfigurable interconnect structure in the programmable integrated circuit, the reconfigurable interconnect structure having a plurality of interconnect nodes electrically connected in a tree configuration, the interconnect nodes including a root node;

providing a plurality of memory cells in the programmable integrated circuit, the memory cells electrically connected to the interconnect structure to form leaf nodes of the tree, each of the memory cells containing at least one memory location for storing binary data;

receiving a parallel multi-bit address word indicative of a selected memory location at the root node;

traversing the interconnect structure from the root node to a memory cell containing the selected memory location based upon at least a portion of the multi-bit parallel address word by branching from each of the interconnect nodes to a successor node in response to receiving a plurality of parallel address bits, the successor node based upon one of the parallel address bits and providing at least one of the remaining address bits in parallel to the successor node; and providing a communication path using the interconnect structure for accessing the selected memory location from the root node.

13. The method of claim 12 wherein the memory cells are homogeneous.

14. The method of claim 12 wherein each of the memory cells contains a plurality of memory locations.

15. The method of claim 12 further comprising the step of communicating a signal representative of a bit stored in the selected memory location from the one of the memory cells to the root node via the communication path.

16. The method of claim 12 further comprising the step of communicating a signal representative of a bit to be stored in the selected memory location from the root node to the one of the memory cells via the communication path.

17. The method of claim 16 further comprising the step of communicating a control signal from the root node to the one of the memory cells via the communication path to enable the bit to be stored in the selected memory location.

18. The method of claim 12 wherein each of the memory cells includes a corresponding random access memory.

19. The method of claim 12 wherein the programmable integrated circuit is a programmable gate array integrated circuit.

20. The method of claim 12 wherein the programmable gate array integrated circuit is a field programmable gate array.

21. A hierarchical memory for use in a programmable integrated circuit, the hierarchical memory comprising:

a reconfigurable interconnect structure having a root interconnect node electrically connected in a tree configuration to at least two leaf nodes, the root interconnect node receiving a parallel multi-bit parallel data word representing an operand, the interconnect structure including a first interconnect node electrically connected to the root node for receiving the parallel multi-bit data word, a second interconnect node in communication with the first interconnect node and a first portion of the parallel multi-bit word, and a third interconnect node in communication with the first and second interconnect nodes and a second portion of the parallel multi-bit data word; and a first memory cell electrically connected to the reconfigurable interconnect structure to form one of the leaf nodes of the tree, the first memory cell having at least one address line for each bit in the parallel multi-bit data word and containing memory locations for storing binary data each representing a binary sum of the parallel multi-bit data word;

a second memory cell electrically connected to the reconfigurable interconnect structure to form one of the leaf nodes of the tree, the second memory cell having address lines connected to at least a portion of the parallel multi-bit data word and containing memory locations for storing binary data representing a carry bit for the binary sums of at least the portion of the parallel multi-bit data word;

wherein the interconnect structure is traversed from the root node to the first and second memory cells based upon the parallel multi-bit data word representing an operand, and wherein the interconnect structure provides a communication path for transferring the binary sum and binary carry of the parallel multi-bit data word to the root node.

22. The hierarchical memory of claim 21 wherein the multi-bit data word includes at least two bits representing an operand and one bit representing a carry-in, wherein the first memory cell includes memory locations for storing binary data representing a binary sum of the operand and the carry-in, and wherein the second memory cell includes memory locations for storing binary data representing a binary carry of the operand and the carry-in such that the hierarchical memory functions as a binary full adder.

23. The hierarchical memory of claim 21 wherein the:

first interconnect node electrically connected to the root node receives the parallel multi-bit data word representing the operand and transfers the binary sum and binary carry to the root node the third interconnect node receiving a binary carry bit from the second memory cell via the second interconnect node;

the hierarchical memory further comprising:

a third memory cell electrically connected to the third interconnect node to form one of the leaf nodes of the tree, the third memory cell having address lines connected to the second portion of the parallel multi-bit data word and the binary carry bit from the second memory cell via the second and third interconnect nodes, the third memory cell including memory locations for storing binary data representing a binary sum of the second portion of the parallel multi-bit data word and the binary carry bit; and a fourth memory cell electrically connected to the third interconnect node to form one of the leaf nodes of the tree, the fourth memory cell having address lines connected to the second portion of the parallel multi-bit data word and the binary carry bit from the second memory cell via the second and third interconnect nodes, the third memory cell including memory locations for storing binary data representing a binary carry of the second portion of the parallel multi-bit data word and the binary carry bit.

24. A hierarchical memory for use in a programmable integrated circuit, the hierarchical memory comprising:

a reconfigurable interconnect structure having at least one interconnect node electrically connected in a tree configuration to at least two leaf nodes, the interconnect node receiving a parallel multi-bit parallel data word representing an operand; and a first memory cell electrically connected to the reconfigurable interconnect structure to form one of the leaf nodes of the tree, the first memory cell having at least one address line for each bit in the parallel multi-bit data word and containing memory locations for storing binary data each representing a first function of the parallel multi-bit data word;

a second memory cell electrically connected to the reconfigurable interconnect structure to form one of the leaf nodes of the tree, the second memory cell having address lines connected to at least a portion of the parallel multi-bit data word and containing memory locations for storing binary data representing a second function of at least the portion of the parallel multi-bit data word;

wherein the interconnect structure is traversed from the root node to the first and second memory cells based upon the parallel multi-bit data word representing an operand, and wherein the interconnect structure provides a communication path for transferring the first and second functions of the parallel multi-bit data word to the root node, the interconnect structure including a first interconnect node connected to the root node, a second interconnect node in communication with the first interconnect node and the first and second memory cells and a first portion of the parallel multi-bit word, and a third interconnect node in communication with the first and second interconnect nodes and a second portion of the parallel multi-bit data word and receiving an input from the second memory cell via the second interconnect node.

25. The hierarchical memory of claim 24 further comprising:

a third memory cell electrically connected to the third interconnect node to form one of the leaf nodes of the tree, the third memory cell having address lines connected to the second portion of the parallel multi-bit data word and the output of the second function from the second memory cell via the second and third interconnect nodes, the third memory cell including memory locations for storing binary data representing a third function of the second portion of the parallel multi-bit data word and the output of the second function; and a fourth memory cell electrically connected to the third interconnect node to form one of the leaf nodes of the tree, the fourth memory cell having address lines connected to the second portion of the parallel multi-bit data word and the output of the second function from the second memory cell via the second and third interconnect nodes, the third memory cell including memory locations for storing binary data representing a fourth function of the second portion of the parallel multi-bit data word and the output of the second function.

* * * * *